Oct. 1, 1957 D. J. BAKER 2,808,480
ELECTRIC CURB FEELER
Filed Jan. 20, 1956
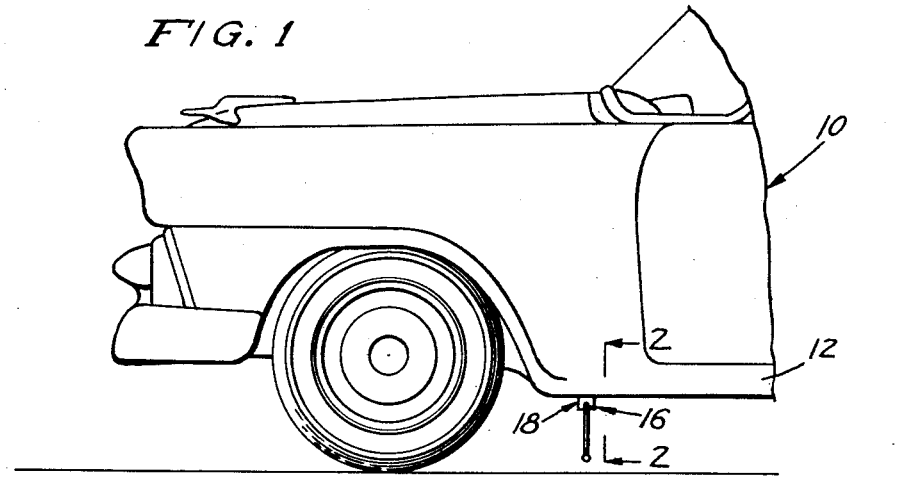
FIG. 1
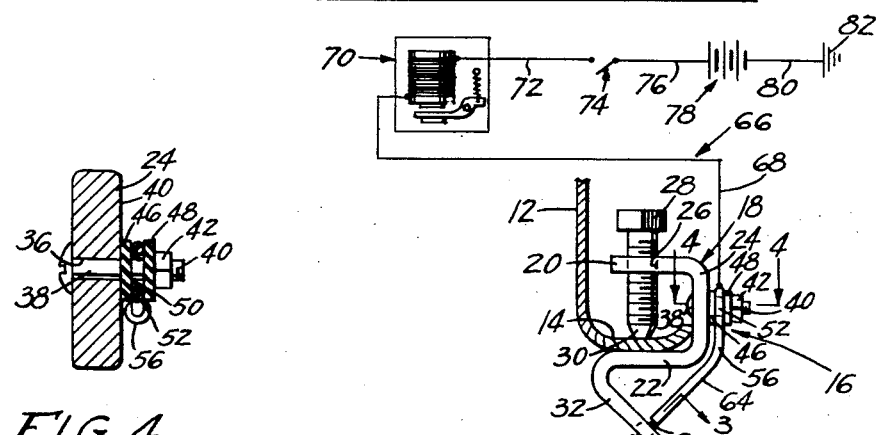
FIG. 4
FIG. 2
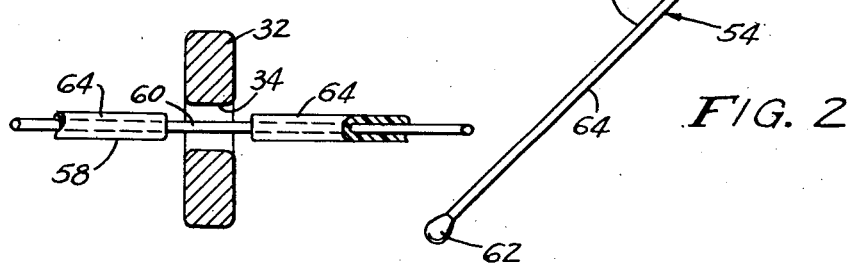
FIG. 3
INVENTOR.
DALE J. BAKER
BY
McMorrow, Berman & Davidson
ATTORNEYS

United States Patent Office 2,808,480
Patented Oct. 1, 1957

2,808,480

ELECTRIC CURB FEELER

Dale J. Baker, Whittier, Calif.

Application January 20, 1956, Serial No. 560,336

1 Claim. (Cl. 200—61.44)

This invention relates generally to a signal device and is more particularly concerned with an improved curb feeler incorporated in an electrical circuit for actuating an electrically operated signal device located within a vehicle.

The primary object of invention in conformance with that set forth is to provide a curb feeler assembly securable and depending in extending relationship from a vehicle, said feeler assembly being operatively connected to an electric signal circuit including signal means within the vehicle, the feeler assembly including a feeler element constituting the switch for actuating the signal circuit upon engagement of the terminal end portion thereof with a curb proximate the position into which the vehicle is being parked.

A further object of invention in conformance with that set forth is to provide a curb feeler assembly of the character set forth which is readily and economically manufactured, easily installed and maintained, and highly practical, serviceable and efficient for the purpose of apprising a vehicle operator by means of a signal located within a vehicle upon which the curb feeler assembly is mounted of the immediate proximity of a curb adjacent the position in which the vehicle is being parked.

These together with other objects and advantages will become subsequently apparent and reside in the details of construction and operation as more fully hereinafter described and claimed, reference being had to the accompanying drawing forming a part hereof, wherein like numerals refer to like parts throughout, and in which:

Figure 1 is a fragmentary side elevational view of a portion of a vehicle upon which the novel curb feeler assembly is mounted;

Figure 2 is an enlarged sectional view taken substantially on line 2—2 of Figure 1, showing diagrammatically the electrical circuit and signal means thereof;

Figure 3 is a further enlarged fragmentary sectional view taken substantially on line 3—3 of Figure 2, with portions broken away and shown in section; and Figure 4 is a further enlarged sectional view taken substantially on line 4—4 of Figure 2.

Referring to the drawings, a fragmentary portion of a vehicle is indicated generally at 10 said vehicle including a lower fender portion 12 having a horizontally disposed inner flange portion 14 upon which the novel curb feeler assembly 16 is mounted in a manner to subsequently be described.

The curb feeler assembly 16 includes a bracket member 18 having upper and lower flange portions 20 and 22 which are suitably connected to or integral with a vertical bight portion 24, the upper flange having a transverse internally threaded aperture portion 26 through which extends a suitable securing screw 28 which has a lower pointed end portion 30 engageable on the upper surface of the mounting flange of the vehicle, the upper surface of the lower flange 22 being engageable with a lower surface portion of said mounting flange 14. The pointed end 30 provides a clamping engagement of the bracket member 18 on the mounting flange 14 and insures a positive transmittal of electrical energy to the vehicle chassis which will conventionally include a single line system conventionally found in passenger vehicles, for example.

The flange 22 continues as a downwardly angulated extension flange portion 32 disposed at substantially forty-five degrees relative to the flange 22, and having extending therethrough a transverse aperture 34 for a purpose to subsequently become apparent.

As seen in Figure 4, the bight portion 24 has extending transversely therethrough an aperture portion 36 through which extends a bolt element 38 having suitably secured on the threaded end portion 40 retaining nut element 42. Circumposed on the bolt element 38 between the securing nut element 42 and the oppositely disposed surface portion 44 of the bight portion 24 is a pair of spaced insulating washer elements 46 and 48 which are in spaced relationship having interposed therebetween a reduced diameter insulating washer element 50 which has extending thereabout the upper circular eye portion 52 of an elongated curb feeler element indicated generally at 54. The portion 52 continues as a depending portion 56 extending substantially parallel to the bight portion 24 of the mounting bracket, and continuing as an angulated body portion 58 which is disposed at substantially ninety degrees or normal to extension flange 32 and having an intermediate portion 60 extending through the aperture 34 of said flange 32, the body portion 58 terminating in an enlarged terminal end portion 62 engageable with a vertical curb adjacent a position in which the vehicle is being parked.

The curb feeler element 54 has circumposed about the body portion 58 thereof on opposite sides of the intermediate portion 60 suitable insulating material 64 thus leaving the intermediate portion 60 thereof which extends through the aperture 34 disposed in substantially concentric relationship to said aperture 34. The curb feeler element is constructed of any suitable electrical conducting material and is of a resilient character whereby it has a substantially permanent set thus maintaining it normally in the aforementioned concentric relationship. However, when the end portion of the curb feeler engages a curb, the intermediate portion 60 thereof will become engaged with the flange 32 such engagement constituting a switch assembly when said portion 60 engages the adjacent portion of flange 32 surrounding aperture 34.

The electrical circuit connected to the curb feeler element is indicated generally at 66, said circuit including an electrical conducting wire 68 suitably secured to the connection portion 52 of the curb feeler element, it being noted that the insulating washers 44, 48 and 50 preventing an accidental shorting out of such, the electrical conducting wire 68 being suitably connected to signal means indicated generally at 70, said means being of any suitable character being shown as the buzzer type, the circuit continuing as an electrical conducting wire 72 operatively connected to one side of a conventional switch 74, said switch 74 being connected by means of an electrical conducting wire 76 to a source of potential such as the battery 78 of the vehicle, said source of potential or battery being connected by means of the electrical conducting wire 80 to a ground portion 82 which in most conventional systems is the vehicle chassis.

It is to be understood that the signal means 70, and the switch 74 are conveniently located within the vehicle and thus upon engagement of the curb feeler element 54 with sufficient force to cause the intermediate portion 60 thereof to engage the flange portion 32, if the switch 74 is closed, a complete electrical circuit will be made and electrical energy will flow through the signal means thus activating the same and apprising the operator of the proximity of the curb adjacent the vehicle being parked.

Various positional directional terms such as "upper," "lower" etc. utilized herein to have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed is:

An electric curb feeler system comprising a mounting bracket member of an electrical conducting material including a pair of oppositely disposed flange portions securable on a horizontal mounting flange of a vehicle chassis, one of said pair of flanges including a depending angular extension portion having a transverse aperture portion extending therethrough, a resilient elongated curb-engageable feeler element of an electrical conducting material secured in insulated relationship on the bracket member and having an intermediate portion extending through the aperture portion of the extension portion of the bracket member in spaced relationship in said aperture portion, and an electrically operated signal circuit operatively connected to the feeler element, remote signal means connected in said circuit for apprising the operator of the vehicle of the proximity of an adjacent curb, said feeler element including a terminal end portion engageable with the adjacent curb for urging the intermediate portion of the feeler element into engagement with the extension portion of the bracket member and activating the signal means of the signal circuit, said feeler element including insulated portions circumposed along the length of the feeler element on opposite sides of the intermediate portion thereof, said intermediate portion of said feeler element constituting switch means for the signal circuit.

References Cited in the file of this patent

UNITED STATES PATENTS

| | | |
|---|---|---|
| 2,270,687 | Morse | Jan. 12, 1942 |
| 2,482,630 | Mastromarino | Sept. 20, 1949 |
| 2,520,305 | Campbell | Aug. 29, 1950 |
| 2,554,371 | Marx | May 22, 1951 |